T. L. BURTON.
CLASP BRAKE RIGGING.
APPLICATION FILED JUNE 1, 1914.

1,166,179.

Patented Dec. 28, 1915.

WITNESSES

INVENTOR
Thomas L. Burton
BY
Edward A. Wright
ATTORNEY

UNITED STATES PATENT OFFICE.

THOMAS L. BURTON, OF PITTSBURGH, PENNSYLVANIA, ASSIGNOR TO AMERICAN BRAKE COMPANY, OF ST. LOUIS, MISSOURI, A CORPORATION OF MISSOURI.

CLASP BRAKE-RIGGING.

1,166,179.     Specification of Letters Patent.     Patented Dec. 28, 1915.

Application filed June 1, 1914. Serial No. 841,991.

*To all whom it may concern:*

Be it known that I, THOMAS L. BURTON, a citizen of the United States, and a resident of Pittsburgh, in the county of Allegheny and State of Pennsylvania, have invented a certain new and useful Improvement in Clasp Brake-Rigging, of which improvement the following is a specification.

This invention relates to brake rigging for railway trucks, and more particularly to the clasp type of brake in which brake shoes are applied to both sides of each pair of wheels; the general object being to provide an improved rigging of this character in which two sets of truck levers are employed, one on each side of the truck, and having the brake heads on both sides of each wheel pivoted directly to the respective truck levers, whereby the brake heads may be detached by simply removing the pin without disturbing the brake rigging.

Figure 1:
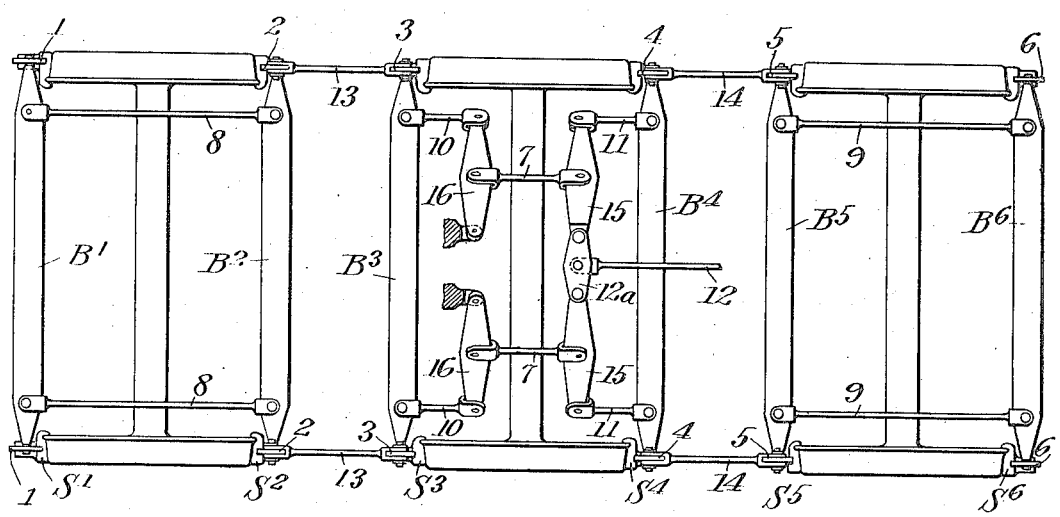
Figure 2:
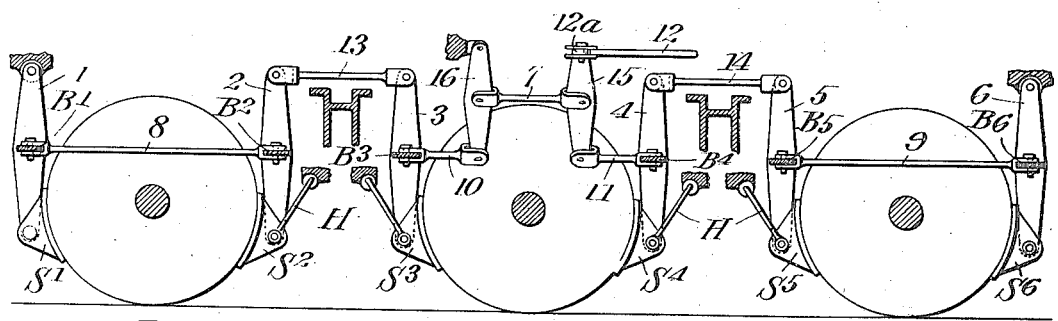
Figure 2:
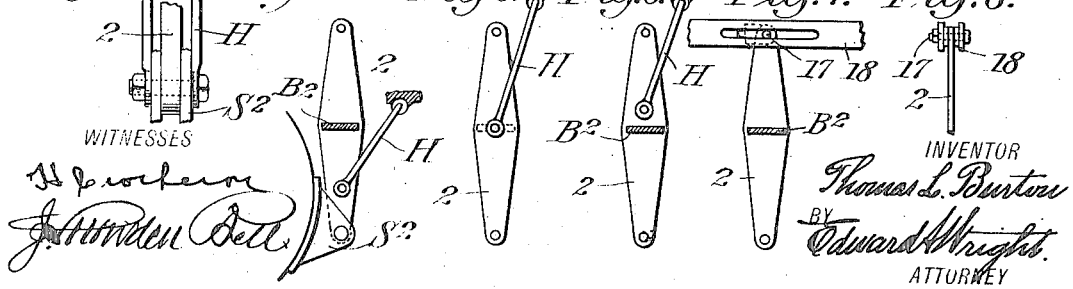

In the accompanying drawings: Figure 1 is a plan of one form of clasp type brake rigging embodying my improvement; Fig. 2, a longitudinal sectional view of the same; and Figs. 3 to 8 inclusive, detail views illustrating different modifications of hanger connections for supporting the truck levers.

According to the construction shown in the drawing, my improvement is applied to a six wheeled truck having brake shoes or heads, such as $S^1$, $S^2$, $S^3$, $S^4$, $S^5$ and $S^6$, at both sides of each wheel, the heads being pivoted directly to the lower ends of the respective truck levers, 1, 2, 3, 4, 5 and 6, upon each side of the truck.

The corresponding truck levers upon opposite sides of the truck are connected by the respective brake beams, $B^1$, $B^2$, $B^3$, $B^4$, $B^5$ and $B^6$, preferably attached at the middle point of said levers. Pull rods, 8 and 9, are provided for connecting the pairs of brake beams, $B^1$ and $B^2$, and $B^5$ and $B^6$, respectively, upon both sides of the truck, and similar rods may be employed for the center pair of brake beams, if the power is applied at the end truck levers, but where the power is applied at the center, intermediate pairs of levers, 15, and 16, joined by rod, 7, and connected by rods, 11 and 10, with the respective brake beams, $B^4$ and $B^3$, may be used, the intermediate levers being actuated by equalizer, $12^a$, and rod, 12, adapted to be operated from a brake cylinder on the car.

The adjoining intermediate truck levers are connected, at their opposite ends, between the pairs of wheels by the respective rods, 13 and 14, while the outside or end truck levers, 1 and 6, have fixed fulcrums at their upper ends. These outside levers also serve as hangers for the brake heads. Separate hangers, H, may be provided for the intermediate truck levers, and the same may be pivotally connected thereto at the brake head pin at the lower end of the lever, as shown in Figs. 2 and 3, or may be attached at a point between the brake head and the brake beam, or at the brake beam, or above the brake beam, as indicated, respectively, in Figs. 4, 5, and 6. If preferred, the hangers may be dispensed with, and the lever be provided with a pin, 17, at its upper end slidably supported in the guides, 18, as shown in Figs. 7 and 8.

It will now be apparent that I have produced an efficient and simple form of equalized clasp brake rigging adapted for use on pivoted railway trucks having a plurality of pairs of wheels, and in which the brake heads are pivotally connected to the truck levers independently of the transverse brake beams, whereby said heads may be readily detached at any time by simply removing the single connecting pin whenever it is desired to remove or renew the brake shoes.

Having now described my invention, what I claim as new and desire to secure by Letters Patent is:

1. In a brake rigging for railway trucks having a plurality of pairs of wheels, the combination of brake heads applied to both sides of each wheel, a truck lever pivotally connected to each brake head, and pull rods for transmitting the stresses between the adjacent truck levers.

2. In a brake rigging for railway trucks having a plurality of pairs of wheels, the combination of brake heads applied to both sides of each wheel, a truck lever pivotally connected to each brake head, transverse brake beams joining corresponding truck levers on opposite sides of the truck, pull rods connecting the brake beams of the respective pairs, and connecting rods for the truck levers.

3. In a brake rigging for railway trucks, having a plurality of pairs of wheels, the combination of brake heads applied to both sides of each wheel, a truck lever pivoted at its lower end to each brake head, transverse brake beams joining corresponding truck levers at an intermediate point, connecting rods for the brake beams and other rods connecting the upper ends of the truck levers between the adjacent pairs of wheels.

4. In a brake rigging for railway trucks having a plurality of pairs of wheels, the combination of brake heads applied to both sides of each wheel, a truck lever pivotally connected to each brake head, transverse brake beams joining corresponding truck levers on opposite sides of the truck, the end truck levers having fixed fulcrums, hangers for supporting the other truck levers, and connecting rods for the brake beams and for the intermediate truck levers.

5. In a brake rigging for railway trucks having a plurality of pairs of wheels, the combination of brake heads applied to both sides of each wheel, a truck lever pivotally connected to each brake head, transverse brake beams joining corresponding truck levers on opposite sides of the truck, the end truck levers having fixed fulcrums, connecting rods for the brake beams of the outside pairs of wheels, other rods connecting the truck levers between adjacent pairs, and intermediate floating levers connected to the intermediate brake beams.

In testimony whereof I have hereunto set my hand.

THOMAS L. BURTON.

Witnesses:
F. G. CRAIG,
C. C. ZIEGLER.